United States Patent
Schütte et al.

[11] Patent Number: 6,159,252
[45] Date of Patent: *Dec. 12, 2000

[54] PROCESS AND DEVICE FOR PRODUCING GRANULATES BY FLUIDIZED BED SPRAY GRANULATION

[75] Inventors: Rüdiger Schütte, Frankfurt; Claas-Jürgen Klasen, Freigericht; Martin Bewersdorf; Hans-Christian Alt, both of Gelnhausen, all of Germany

[73] Assignee: Degussa-Hüs Aktiengesellschaft, Frankfurt am Main, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/913,970

[22] PCT Filed: Apr. 3, 1996

[86] PCT No.: PCT/EP96/01453

§ 371 Date: Sep. 26, 1997

§ 102(e) Date: Sep. 26, 1997

[87] PCT Pub. No.: WO96/33009

PCT Pub. Date: Oct. 24, 1996

[51] Int. Cl.$^7$ .................................................. C01B 15/10
[52] U.S. Cl. .................................. 23/313 FB; 23/293 R; 34/369; 71/64.04; 422/142; 423/415.2; 425/222
[58] Field of Search .................... 23/313 FB, 295 R; 423/415.2; 71/64.04; 425/222; 34/369; 422/142

[56] References Cited

U.S. PATENT DOCUMENTS

| | | | |
|---|---|---|---|
| 3,152,005 | 10/1964 | Tuttle | 23/313 FB |
| 3,549,713 | 12/1970 | Kohn | 264/8 |

(List continued on next page.)

FOREIGN PATENT DOCUMENTS

| | | |
|---|---|---|
| 332929 | 3/1989 | European Pat. Off. . |
| 25 00 601 | 7/1975 | Germany . |
| 32 04 466 | 10/1982 | Germany . |
| 228458 | 10/1985 | Germany . |
| 37 16 968 | 12/1988 | Germany . |
| 12 94 352 | 3/1995 | Germany . |
| 43 29 205 | 3/1995 | Germany . |
| 2-90957 | 3/1990 | Japan . |

OTHER PUBLICATIONS

Simon, E. Containment of Hazardous in Fluid–Bed Technology Manufacturing Chemist & Aerosol News Jan. 1978 pp. 23–32.

(List continued on next page.)

*Primary Examiner*—Gary P. Straub
*Attorney, Agent, or Firm*—Smith Gambrell & Russell, LLP

[57] ABSTRACT

This invention relates to a process for the production of granulates by fluidized bed spray granulation and to a device for this purpose. Liquid starting materials may be converted into granulates by fluidized bed spray granulation. In order to ensure elevated material throughput, numerous nozzles, which are moreover susceptible to plugging and encrustation, must be installed.

The disadvantages of known processes may be overcome according to the invention by arranging at least two spray nozzles at least partially directed towards each other in such a manner and the quantity of spray is adjusted in such a manner that their spray jets collide within the fluidized bed and substantially no liquid strike-through occurs onto a surface delimiting the fluidized bed or out of the fluidized bed. The spray jets of two spray nozzles directed towards each other collide frontally or enclose an angle of less than 180°; the angle is preferably between 150° and 180°.

The device according to the invention comprises a flow channel (1) with laterally arranged spray nozzles (8), wherein in each case two exactly opposing or staggered spray nozzles are oriented in such a manner that the spray jets collide within the fluidized bed. Sodium percarbonate production is exemplfied.

14 Claims, 1 Drawing Sheet

U.S. PATENT DOCUMENTS

| | | | |
|---|---|---|---|
| 3,549,731 | 12/1970 | Kohn et al. | 264/8 |
| 3,738,821 | 6/1973 | Barber | 23/313 FB |
| 4,237,814 | 12/1980 | Ormos et al. | 168/24 |
| 4,352,718 | 10/1982 | Grün | 23/313 FB |
| 4,428,914 | 1/1984 | Brichard et al. | 423/415.2 |
| 4,501,773 | 2/1985 | Nioh et al. | 23/313 FB |
| 4,704,378 | 11/1987 | Fleming et al. | 23/313 FB |
| 5,213,820 | 5/1993 | Uhlemann | 23/313 FB |
| 5,330,544 | 7/1994 | Thompson et al. | 23/313 FB |
| 5,408,953 | 4/1995 | Thomson et al. | 23/313 FB |
| 5,478,544 | 12/1995 | Schutte et al. | 23/313 FB |
| 5,560,896 | 10/1996 | Bewersdorf et al. | 423/415.2 |

OTHER PUBLICATIONS

Auf Beneit unk technik Bd 8, #9, Sep. 1967 p. 474.

Schaefer et al., "Control of Fluidized Bed Granulation," *Arch. Pharm. Chemi. Sci.* Edition 5, 1977, 51–60.

Simon F., "Containment of Hazards In Fluid–Bed Technology," *Manufacturing Chemist & Aerosol News*, Jan. 1978.

*Aufbereitungs–Technik*, Nr. 9, 1967, page 747.

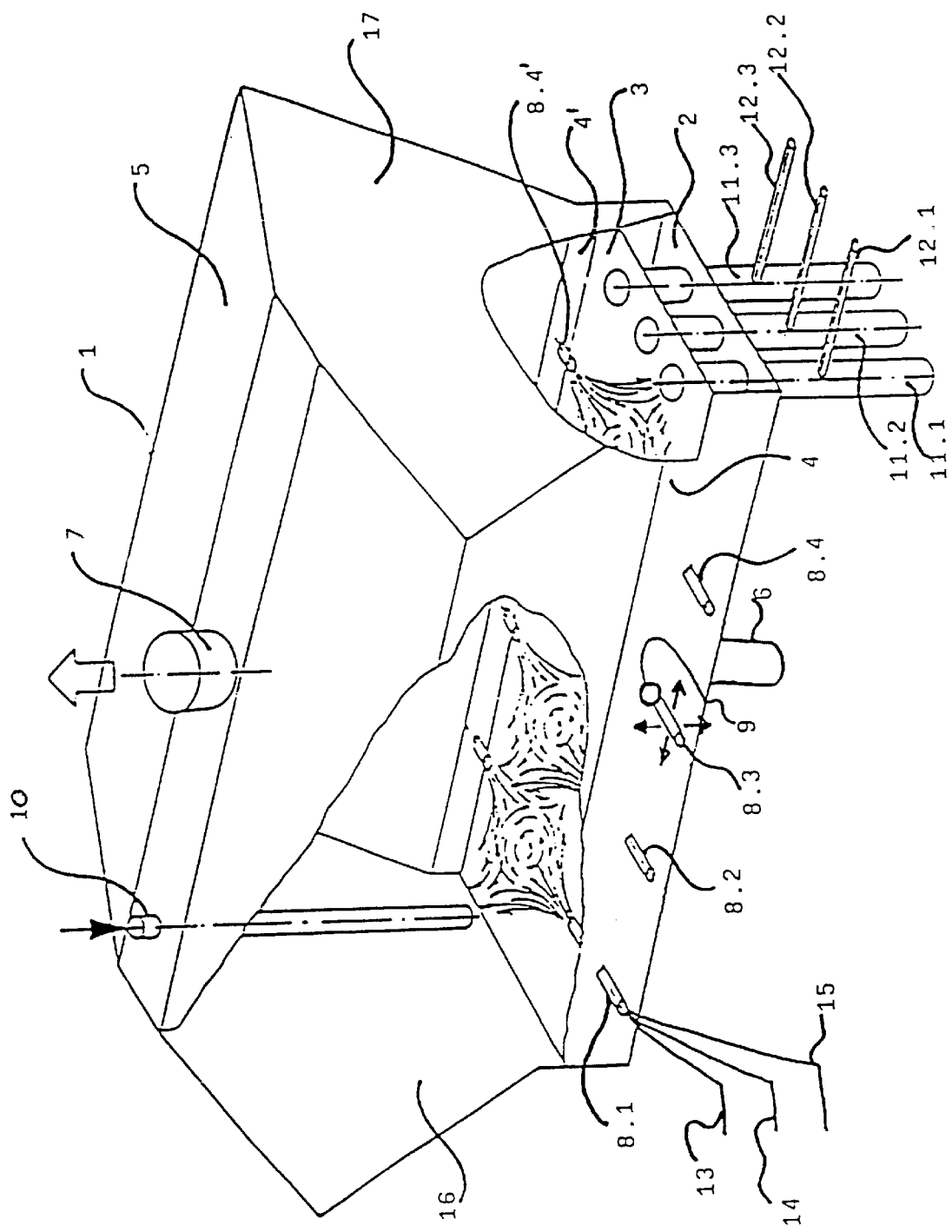
Fig. 1/1

PROCESS AND DEVICE FOR PRODUCING GRANULATES BY FLUIDIZED BED SPRAY GRANULATION

SPECIFICATION

This invention relates to a process for the production of granulates by fluidised bed spray granulation and to a device which is particularly suitable for the performance of the process.

Originally liquid products, in particular suspensions and solutions, but also melts, may be converted by fluidised bed spray granulation into free-flowing, low dust, granular solids, hereinafter termed granulates. In fluidised bed spray granulation, solid particles, which are substantially smaller than the particles to be produced are sprayed with a liquid starting material and simultaneously dried until the particles have achieved the desired grain size. The term "substantially" should be taken to mean that particles of the desired grain size may also be present in addition to the above-stated smaller particles, which also includes the nuclei. In order to guarantee a continuous process, it must be ensured that the nuclei are constantly introduced into the fluidised bed or these nuclei are directly formed in the fluidised bed and granulate is drawn off from the fluidised bed. In order to obtain a granulate with a narrow grain size range, the material is discharged from the fluidised bed with classification or is classified using conventional external pneumatic classifiers; the fine particles obtained during classification, which are not of the desired grain size, are reintroduced into the fluidised bed as nuclei. In the event of discharge with classification and recirculation of undersized particles, the fluidised bed contains all grain size fractions from the nucleus up to the granulate of the desired grain size. A review of continuous fluidised bed spray granulation is provided by H. Uhlemann in Chem.-Ing.-Tech. 62 (1990), no. 10, pages 822–834; this document, which is included in the disclosure of the present application, describes the principles of fluidised bed spray granulation, features of grain growth and fluidisation, various process variants and components of fluidised bed spray granulators.

Depending upon the design of the fluidised bed spray granulator, the liquid starting material containing the dissolved and/or suspended solids or a melt is sprayed into the bed from above, from the side or from below. In order to ensure a sufficient material throughput, the spray nozzles arranged in the device must cover the entire fluidised bed. Uniform surface loading must be achieved. Numerous nozzles must be installed to this end, so entailing considerable capital costs due to the pipework and the necessary measurement and control instrumentation. Moreover, so many nozzles are also susceptible to plugging and encrustation such that shutdowns are frequently necessary for cleaning purposes.

The object of the present invention is to provide an improved process for fluidised bed spray granulation, which avoids the above-stated disadvantages; an elevated fluid throughput should thus be achieved using few nozzles. Due to the superproportional increase in the momentum of the spray at a constant output droplet diameter and the greater spread of the jet as nozzle size increases, a way had to be found to prevent the spray jet from striking through onto the bottom in the case of spraying from the top downwards, onto the walls of the granulation device when spraying from the side or into the gas space above the actual fluidised bed when spraying upwards from below, as such strike-throughs generally bring about a rapid collapse of the process.

This object is achieved by a process for the production of granulates by fluidised bed spray granulation, comprising spraying one or more liquid starting materials by means of spray nozzles into a fluidised bed containing solid particles which are substantially smaller than the granulates to be produced, vaporising volatile constituents of the sprayed starting material(s), introducing nuclei into the fluidised bed or/and forming nuclei therein and discharging granulates from the fluidised bed, which process is characterised in that in each case at least two spray nozzles at least partially directed towards each other are arranged in such a manner and the quantity of spray is adjusted in such a manner that their spray jets collide within the fluidised bed and substantially no liquid strike-through occurs onto a surface delimiting the fluidised bed or out of the fluidised bed. The subordinate claims relate to preferred embodiments of the process according to the invention.

By virtue of the fact that the spray jets from the two spray nozzles at least partially directed towards each other collide frontally or at an angle of less than 180°, preferably at an angle of between 90° and 180° and in particular between 150° and 180°, within the fluidised bed, there is a change in the direction of the momentum of the spray jets. Instead of two spray nozzles directed towards each other, three or more spray nozzles may be arranged in a star configuration, wherein, in the case of a planar arrangement, the spray jets collide in the centre of the star and, in the case of a conical arrangement, at the apex of the cone. In each case, two spray nozzles are preferably at least partially directed towards each other. The total momentum of the colliding spray jets and their direction are adjusted relative to each other in such a manner that any strike-through of liquid onto the opposing wall, onto the bottom of the fluidised bed or into the space above the actual fluidised bed is very largely prevented. Although it is possible to spray the fluidised bed from below and above, the nozzles are preferably arranged laterally in pairs exactly opposite or optionally also staggered relative to each other, such that the fluidised bed is sprayed from the side. When spraying from the side, the direction of the spray jets may be directed horizontally or slightly downwards or slightly upwards. The triangular surface formed by the line connecting two spray nozzles directed towards each other and their spray jets conveniently forms an angle relative to horizontal of between 0° and +90°, in particular between greater than 0° and +15°; the apex of the triangle (contact point of the spray jets) thus points upwards. By virtue of the fact that the spray jets from spray nozzles which are in each case at least partially directed towards each other collide within the fluidised bed, this brings about, on the one hand, further break-up of the spray jets and additionally ensures thorough wetting of the nuclei in the fluidised bed with the liquid droplets from the spray jets. Due to the change in direction of the momentum of individual particles on collision, coverage is also ensured of those areas of the fluidised bed which would hitherto have required two or more nozzles. Where two nozzles directed towards each other spray together at an angle, the resultant vector exerts a momentum on the fluidised material, so conveying the particles in the direction in which the apex of the angle formed by the spray jet points. Depending upon the design of the device used for fluidised bed spray granulation, the spray jets may collide frontally, i.e. at an angle of 180°, or at an angle of less than 180°. The total momentum of each spray jet from two spray nozzles at least partially directed towards each other is conveniently substantially equal; this may simply be achieved by using identical nozzles and identical nozzle operating parameters (quantity and pressure of liquid and gas pressure).

Single fluid or two-fluid nozzles may be used to spray a liquid starting material. In the case of two-fluid nozzles, which are preferred, the second fluid is conventionally air, steam or an inert gas in order to break up the jet as it leaves the nozzle and to disperse it in small droplets. Instead of a single liquid starting material, it is also possible to spray two or more liquid starting materials into the fluidised bed in order to produce a granulate. In this case, the initially liquid starting materials may co-occur within the granulate, or the starting materials may react with each other immediately after spraying and/or during formation of the granulate. In order to produce such reaction products, for example from a liquid reaction component together with a component dissolved or suspended in water or a solvent, it is advantageous to spray both liquid starting materials into the fluidised bed using a three-fluid nozzle and a gas as propellant. In the event that a premature reaction of the reaction components within the nozzle body should be avoided, it is advantageous to use three-fluid nozzles which ensure external mixing of the reaction components. A three-fluid atomising nozzle suitable for this purpose comprises a nozzle body and a nozzle mouthpiece, wherein the nozzle mouthpiece has a central tube and two jacket tubes arranged coaxially around the central tube and the central tube extends, at the nozzle tip, beyond the end of the jacket tubes. The reaction components are introduced into the three-fluid nozzles in accordance with the required stoichiometric ratio.

The process according to the invention using the above-stated three-fluid nozzles is particularly suitable for the production of granular active oxygen compounds, such as sodium perborates and sodium percarbonates and the hydrates thereof. Sodium percarbonate may be produced from an aqueous soda solution and an aqueous hydrogen peroxide solution. Sodium percarbonate of the formula 2 $Na_2CO_3 \cdot 3H_2O_2$ is produced in a similar manner to the process according to DE patent application 43 29 205, the content of which is included in this specification, wherein the three-fluid nozzles are, however, arranged according to the invention.

In order to operate fluidised bed spray granulation continuously, it must be ensured that a sufficient number of nuclei and/or other particles which are smaller than the desired granulate are constantly present in the fluidised bed. The nuclei may be introduced into the fluidised bed, for example in the form of the dust recovered in a dust separator downstream from the granulator and/or in the form of the undersized material separated from the granulate discharge from the fluidised bed. When a granulate discharge with classifying action is used, this undersized material may remain in the fluidised bed or alternatively may also be separated in a conventional pneumatic classifier downstream from the granulate discharge and returned to the fluidised bed. Nuclei may also be formed directly within the fluidised bed: nuclei arise, on the one hand, from droplets which have not met with another nucleus before drying, and, on the other hand, by breakage and abrasion due to particle motion; devices to comminute particles may moreover be installed within the fluidised bed, by which means two or more smaller particles are produced from larger particles. Finally, the arrangement according to the invention of two spray nozzles, the spray jets of which collide more or less frontally within the fluidised bed, may bring about a jet mill effect as a consequence of the elevated momentum of the spray jet, so forming nuclei. The extent of the jet mill effect may be controlled by the quantity of gas flowing through the spray nozzles, i.e. at a given nozzle geometry by means of pressure, and by the angle at which the spray jets from spray nozzles directed towards each other collide.

The fluidised bed is maintained in a manner known per se using a suitable fluidising gas, generally air. Since the volatile constituents introduced with the liquid starting material must be vaporised and driven off during fluidised bed spray granulation, the drying energy necessary for this purpose is conventionally introduced with the fluidising gas. The temperature of the fluidising gas is selected in such a manner that, in conjunction with the injected quantity of liquid, the resultant fluidised bed temperature has no disadvantageous effect upon the starting materials and the granulate to be produced. In the case of heat-sensitive materials, such as the above-mentioned sodium percarbonate, the temperature of the fluidised bed should be substantially below the decomposition temperature of the starting products used and of the granulate to be produced.

The process according to the invention may be performed in conventional devices for fluidised bed granulation, as are, for example, mentioned in the above-stated document. According to a preferred embodiment of the process according to the invention, a fluid bed drier, hereinafter termed a flow channel, is used, the bottom of which is arranged as a fluidising base plate and which has laterally arranged spray nozzles along the flow channel which are opposite or optionally slightly staggered relative to each other. The nozzles are conveniently located in the side walls along the flow channel. The spray nozzles are preferably exactly opposite each other. The nozzle axis of nozzles which are exactly opposite or staggered relative to each other may here be oriented in such a manner that the spray jets collide perpendicularly and that the spray jets form a preferably obtuse angle. The triangle formed by two nozzles at least partially directed towards each other and the meeting point of the nozzle jets lies within the fluidised bed; the triangle may be oriented horizontally, or also slightly rising upwards or falling downwards.

In order to allow trouble-free operation of fluidised bed spray granulation, it has proved convenient to use a fluidising base plate which has nostril-like air outlets: through these outlets, the granulates are obliquely fluidised at an angle of less than 90° relative to horizontal in the zones of the bed close to the bottom, so purposefully conveying the granulates in this area. The above-mentioned nozzle momentum arising from two nozzle jets partially directed towards each other may be directed in the same direction as or in the opposite direction to the stated bottom flow. In the latter case, the residence time of the particles in the fluidised bed is extended. According to another preferred embodiment, the particles on the bottom are circulated in the direction of the granulate discharge and, in the upper zone of the fluidised bed, in the direction towards the beginning of the flow channel.

The flow channel may take the form of a single chamber or may be divided into two or more chambers. Combined underflow and overflow weirs act as separators between the chambers; according to a convenient development, such weirs have a horizontal slot at the bottom and within the depth of the expanded fluidised bed. The larger particles collecting in the vicinity of the bottom are transported towards the weir by the nozzle momentum and/or the gas inlet flow directed through the fluidising base plate and pass through the lower slot into the next adjacent chamber. Due to the liquid-like behaviour of fluidised beds, this inevitably causes return flow of solids, which preferably occurs at the upper slot. This back flow may be strengthened by the vector resulting from the collision of two spray jets, if this vector is directed in the same direction as the desired back flow. Another possibility for strengthening the back flow of solids in the upper zone of the fluidised bed is to establish a reduced pressure in the chambers, with the pressure being lower in the next adjacent chamber, so creating pneumatic transport through the slots above the fluidised bed into the upstream chamber, i.e. contrary to the direction of flow prevailing at the bottom of the fluidised bed.

When performing the process according to the invention, it is also possible, instead of a single flow channel, to arrange two or more flow channels as adjacent modules, for example in the manner as is known from EP-B 0 332 929. In contrast to the embodiment in that document, the spray nozzles in the process according to the invention are not in the fluidising base plate, but within the depth of the fluidised bed in the side walls delimiting the modules arranged in parallel, together with suitable mountings for the nozzles between the individual modules.

As already explained, the process according to the invention may be performed in per se known devices for fluidised bed spray granulation, providing that in each case at least two spray nozzles are arranged at least partially directed towards each other, in order to change the direction of the momentum of each spray jet by means of the collision of the spray jets. The spray nozzles are preferably arranged in such a manner that they spray into the fluidised bed from the side of the device.

A device well suited to the performance of the process according to the invention comprises a flow channel or a rectangular fluidised bed granulator consisting of flow channel type modules arranged in parallel to each other, containing a fluidising base plate, inlet and outlet devices for a fluidising gas, devices for discharging granulate and, if necessary, for the introduction of nuclei and/or other particles smaller than the granulates to be produced, together with at least two spray nozzles for spraying one or more liquid starting materials, which device is characterised in that along both sides of the flow channel or flow channel type modules, spray nozzles are arranged at a height above the fluidising base plate and below the upper limit of the fluidised bed, wherein in each case two exactly opposing or staggered spray nozzles are oriented in such a manner that the spray jets of these spray nozzles which are at least partially directed towards each other collide within the fluidised bed zone. The subordinate claims relate to preferred embodiments.

FIG. 1/1 shows a perspective, partially open view of a flow channel according to the invention: the flow channel 1 contains an air box 2, into which the inlet air is introduced through the inlet air port 6. The fluidising base plate 3 is located above the air box, the base plate taking the form of a perforated base plate (perforations not shown), wherein the perforations are of such a form that they allow perpendicular or oblique flow of the fluidising air. The fluidising base plate is preferably in the form of a rolled perforated base plate with oblique outlets. The flow channel is delimited along the direction of flow by the (opposing) side walls 4 and 4', wherein these side walls from the bottom to the cover 5 may be arranged vertically, inclined outwards or be both vertical and inclined outwards. The fluidising air is introduced through the port 6 and discharged through the port 7 (exhaust air outlet). Four spray nozzles 8.1, 8.2, 8.3 and 8.4 are arranged in the side wall 4, in the present case slightly above the fluidising base plate; another nozzle directed towards each nozzle is arranged on the opposite side wall 4' (only nozzle 8.4' is shown). According to a preferred embodiment, the nozzles may be oriented around an articulation 9 upwards, forwards and backwards (the articulation 9 and the directions of rotation are shown only for nozzle 8.3). External nuclei are introduced into the fluidised bed via the inlet device 10. Granulate is discharged from the fluidised bed through a discharge device (in this case three discharge tubes 11.1, 11.2 and 11.3), wherein the stated tubes directly adjoin the fluidising base plate. In the figure, the discharge tubes are in the form of devices with a classifying action, wherein classifying air is introduced into the discharge device via lines 12.1, 12.2 and 12.3. The spray nozzles may take the form of single or multi-fluid nozzles; in the present figure they take the form of three-fluid nozzles, wherein one liquid starting material is introduced through each of lines 13 and 14 and a gas for spraying is introduced through line 15 (the inlet lines 13, 14 and 15 are shown only for nozzle 8.1, and have been omitted from the remaining nozzles for reasons of clarity). The flow channel is delimited at the upper and lower ends by walls 16 and 17. The vectors arising from the spray jets directed towards each other are shown schematically in the open section of the flow channel.

The product discharge 11.1, 11.2 and 11.3 may take the form of a simple tube, if no particularly severe requirements are made with regard to the uniformity of the grains of the granulate or if a pneumatic classifier is located downstream from the discharge. In the event that, as shown in FIG. 1, discharge is performed with classification, conventional pneumatic classifiers are suitable for this purpose, for example those operating using the principle of zigzag pneumatic classification. An integrated or downstream classifier is conveniently provided with devices for returning the undersized material to the fluidised bed.

According to another embodiment, the flow channel is subdivided into two or more chambers, wherein the separating wall in each case takes the form of a combined underflow and overflow weir; such weirs have a horizontal slot, for example at the bottom and in the depth of the expanded fluidised bed.

The spray nozzles arranged on both sides of the flow channel or of the flow channel type modules may be staggered, provided that they are oriented in such a manner that the spray jets collide within the fluidised bed. Preferably, however, the spray nozzles are arranged exactly opposite each other, in fact with the nozzle jet being oriented in such a manner that the jets collide perpendicularly or at an angle preferably of between 150 20 and less than 180°.

It has become possible by means of the process according to the invention to obtain fluidised bed granulates in flow channels of a simple design at an elevated space-time yield and with low capital costs with regard to the number of nozzles. Surprisingly, virtually no encrustation occurs on the nozzles, such that little downtime is required for cleaning the fluidised bed spray device. By means of appropriately orienting the opposing nozzles and adjusting the momentum of each spray jet by the selected pressure of the spraying gas, it is possible to exploit the jet mill effect and reliably to control the number of nuclei within the fluidised bed and thus also the size of the granulate. It should be noted in this connection that the pressure of the spraying gas also to a certain extent influences the produced droplet size range. Particular advantages of the device according to the invention reside in its simple design and in that it is possible reliably to perform the process according to the invention in it. The nozzle arrangement according to the invention may moreover readily be integrated into an existing device for fluidised bed spray granulation, by arranging the nozzles laterally in pairs opposite each other.

The following example, which was performed in the device described in FIG. 1, illustrates the process according to the invention.

Example

Sodium percarbonate was produced by spray granulation in a device according to FIG. 1/1. The fluidised bed drier had a base area of 3.3 m² at a width of 1 m. Three nozzles were arranged on each side in the vertical sections of the side walls, uniformly distributed over the wall length and directly opposite each other. The outlet of the nozzles was 100 mm above the fluidising base plate and 50 mm from the side wall in the fluidised bed. The nozzles were inclined by approximately 10° upwards relative to the horizontal and approximately 15° in the conveying direction. Three-fluid nozzles with external mixing were used. Spraying was performed once the initially introduced bed contents had been fluidised. The granulate was discharged through three orifices arranged flush with the fluidising base plate at the end of the drier via a classifying stream of air.

The operating and analytical data during steady state trial operation may be found in the following table:

Starting materials:
- Aqueous soda solution (30 wt. % soda, 1 wt. % sodium water glass), volumetric flow rate/nozzle: 145 l/h Aqueous hydrogen peroxide (70 wt. %), volumetric flow rate/nozzle: 30 l/h
- Nozzle air pressure: 3.5 bar (overpressure) Quantity of nozzle air: 150 Nm³/h and nozzle Operating data:
- Quantity of fluidising air: 10000 Nm³/h Fluidising air temperature: 205° C.
- Nucleus feed: approx. 10 kg/h (average grain diameter 0.1 mm)
- Bed contents: approx. 800 kg At these settings, product output of approximately 485 kg/h was obtained. Particle size distribution was determined by screening, giving the following results:
- >0.8 mm 18%
- >0.5 mm 51%
- >0.3 mm 26%
- <0.3 mm 5%

We claim:

1. A process for producing solid granulates from at least one starting material by fluidized bed spray granulation, comprising:

performing said spray granulation in a flow channel, the bottom of which is arranged as a fluidizing base plate;

spraying at least one liquid starting material from at least one pair of spray nozzles onto particles in a fluidized bed;

wherein each of said spray nozzles is at least a two-fluid nozzle for dispensing at least two fluids;

wherein one fluid of said at least two fluids is a gas for atomizing fluid droplets of said liquid starting material;

wherein the nozzles of said at least one pair of spray nozzles are at least partially directed toward each other;

wherein said at least one pair of spray nozzles are arranged laterally along said flow channel;

wherein spray jets from said spray nozzles directed toward each other collide and form an angle of from 150° to 180° wherein line connecting two spray nozzles facing each other and the spray jets emitted therefrom form an angle relative to horizontal of from 0° to +15° C., wherein the quantity of spray is adjusted so that the spray jets collide within said fluidized bed and substantially no liquid strike-through occurs onto a surface delimiting the fluidized bed or out of the fluidized bed, and wherein said liquid starting material is converted into solid granulates.

2. The process according to claim 1, wherein a total momentum of each colliding spray jet is substantially equal.

3. The process according to claim 1, wherein said at least one pair of spray nozzles are arranged laterally and arranged opposite each other along said flow channel within a depth of said fluidized bed.

4. The process according to claim 1, further comprising:

pneumatically classifying said granulates during or after discharging said granulates; and returning said granulates which are smaller than a predetermined size to said fluidized bed.

5. The process according to claim 1, wherein said flow channel is subdivided into two or more chambers, and wherein a separating wall between said chambers takes the form of a weir having a horizontal slot both at the bottom and in the depth of the expanded fluidized bed.

6. The process according to claim 1, wherein said spray nozzles are three-fluid nozzles in which said sprayed liquid starting material is contacted outside of said nozzle.

7. A device for producing solid granulates from at least one liquid starting material by fluidized bed spray granulation, comprising:

a flow channel, the bottom of which is arranged as a fluidizing base plate;

at least one pair of spray nozzles, arranged laterally along said flow channels and at least partially directed toward each other, each nozzle of which is at least a two-fluid nozzle for dispensing at least two fluids, in which one of said fluids is said at least one liquid starting material to be sprayed onto particles in a fluidized bed, and in which the other of said fluids is a gas for atomizing fluid droplets of said at least one liquid starting material;

wherein spray jets from said spray nozzles collide and form an angle of from 150° to 180°, and wherein a line connecting said at least one pair of spray nozzles directed toward each other and the spray jets emitted therefrom form an angle relative to horizontal of from 0° to 15°;

wherein a quantity of material comprising said spray jets is adjusted so that the spray jets collide within said fluidized bed such that substantially no liquid strike-through occurs onto a surface delimiting said fluidized bed, or outside of said fluidized bed; and wherein said at least one liquid starting material contacts said particles to form said solid granulates.

8. The device according to claim 7, further comprising:

a granulate discharge means having an integrated pneumatic classifier, and a means for returning particles smaller than a predetermined size to said fluidized bed.

9. The device according to claim 7, wherein said flow channel comprises two or more chambers with separating walls therebetween which form a combined underflow and overflow weir.

10. A process of producing granulates by fluidized bed spray granulation using the apparatus according to claim 7.

11. The process according to claim 10, wherein said particles in said fluidized bed comprise nuclei having an average grain diameter of 0.1 mm which comprise about 2% of the resulting solid granulate.

12. The process according to claim 10, wherein a volumetric flow rate of materials flowing from said nozzles is from 30–145 l/h.

13. The process according to claim 10, wherein said gas is pressurized.

14. The process according to claim 10, wherein said solid granulates are relatively dense and substantially spherical.

* * * * *